United States Patent [19]

Shikakura et al.

[11] Patent Number: 5,502,570
[45] Date of Patent: Mar. 26, 1996

[54] IMAGES REPRODUCING METHOD CAPABLE OF SKIPPING REPRODUCTION OF COLLATERAL INFORMAITON DURING REPRODUCTION IN A SPECIAL MODE

[75] Inventors: Akihiro Shikakura, Kawasaki; Motokazu Kashida, Musashino; Ikuo Watanabe, Kawasaki, all of Japan

[73] Assignee: Canon Kabushiki Kaisha, Tokyo, Japan

[21] Appl. No.: 653,897

[22] Filed: Feb. 12, 1991

[30] Foreign Application Priority Data

Feb. 13, 1990 [JP] Japan .................................... 2-31722
Feb. 13, 1990 [JP] Japan .................................... 2-31732

[51] Int. Cl.⁶ ............................ H04N 5/76; H04N 5/781
[52] U.S. Cl. ........................ 358/335; 358/342; 358/312
[58] Field of Search ............................... 358/335, 310, 358/330, 133, 312, 342, 341; 360/33.1, 35.1, 10.1; H04N 5/76

[56] References Cited

U.S. PATENT DOCUMENTS

| | | | |
|---|---|---|---|
| 3,666,888 | 5/1972 | Sekimoto | 358/136 |
| 4,280,192 | 7/1981 | Moll | 364/900 |
| 4,751,572 | 6/1988 | Baumbaugh et al. | 358/133 |
| 4,777,537 | 10/1988 | Ueno et al. | 358/341 |
| 4,843,484 | 6/1989 | Kanamura et al. | 358/342 |
| 4,866,719 | 9/1989 | Morgan et al. | 371/40.1 |
| 4,931,879 | 6/1990 | Koga et al. | 358/335 |
| 5,006,939 | 8/1991 | Cawley | 358/341 |
| 5,027,230 | 6/1991 | Nakayama | 358/312 |
| 5,047,868 | 9/1991 | Takeda et al. | 358/335 |
| 5,050,003 | 9/1991 | Horii et al. | 358/342 |
| 5,122,886 | 6/1992 | Tanaka | 358/335 |
| 5,130,813 | 7/1992 | Oie et al. | 358/335 |
| 5,136,391 | 8/1992 | Minami | 358/312 |
| 5,136,394 | 8/1992 | Haikawa et al. | 358/335 |
| 5,136,395 | 8/1992 | Ishii et al. | 358/335 |

OTHER PUBLICATIONS

White, J. et al., "Higher Level Protocols Enhance Ethernet", Electronic Design, Apr. 15, 1982, pp. ss33–ss41.
Estrin, J. et al., "Gateways Promise to Link Local Networks into Hybrid Systems", Electronics, Sep. 22, 1982, pp. 145–150.
Cunningham, I. et al., "Electronic Mail Standards to Get Rubber–Stamped and Go Worldwide", Data Communications, May 1984.
Jacobson, D. et al. "A Master/Slave Monitor Measurement Technique for Operating Ethernet Network", IEEE Network, vol. 1, No. 3, Jul. 1987, pp. 40–48.
Zett, J., "Evaluating and Testing LAN Performance", Telecommunications Products and Technology, Aug. 1987, pp. 40–44.
Barnett, B. et al., "LANCET Local Area Network Comprehensive Evaluation Tool", Computer Networking Symposium, 1988, pp. 340–347.
Stallings, W., Local Netwerks, 3rd ed., Macmillan Pub. Co. 1990, pp. 142–149, 162–165.

*Primary Examiner*—Tommy P. Chin
*Assistant Examiner*—Huy Nguyen
*Attorney, Agent, or Firm*—Fitzpatrick, Cella, Harper & Scinto

[57] ABSTRACT

A reproducing method for reproducing an image from a recording medium on which are recorded (i) a plurality of basic frame image data representing a whole image, and (ii) a plurality of collateral image data representing a partial image of the whole image. The reproducing method includes the steps of discriminating a plurality of recording locations at which a plurality of basic frame image data are recorded on the recording medium, storing into a memory, the plurality of recording locations of the plurality of basic frame image data discriminated in the discriminating step, without storing a plurality of recording locations of the plurality of collateral image data, and reading a basic frame image data recorded on the recording medium in accordance with the plurality of recording locations of the plurality of basic frame image data stored in the memory to reproduce an image from the read basic frame image data.

8 Claims, 12 Drawing Sheets

| FRAME-CONTROL DATA | IMAGE DATA | VOICE DATA |
|---|---|---|

FIG. 1A

| FRAME-CONTROL DATA CD | PARTIAL-FRAME DATA |
|---|---|

COLLATERAL INFORMATION DATA

FIG. 1B

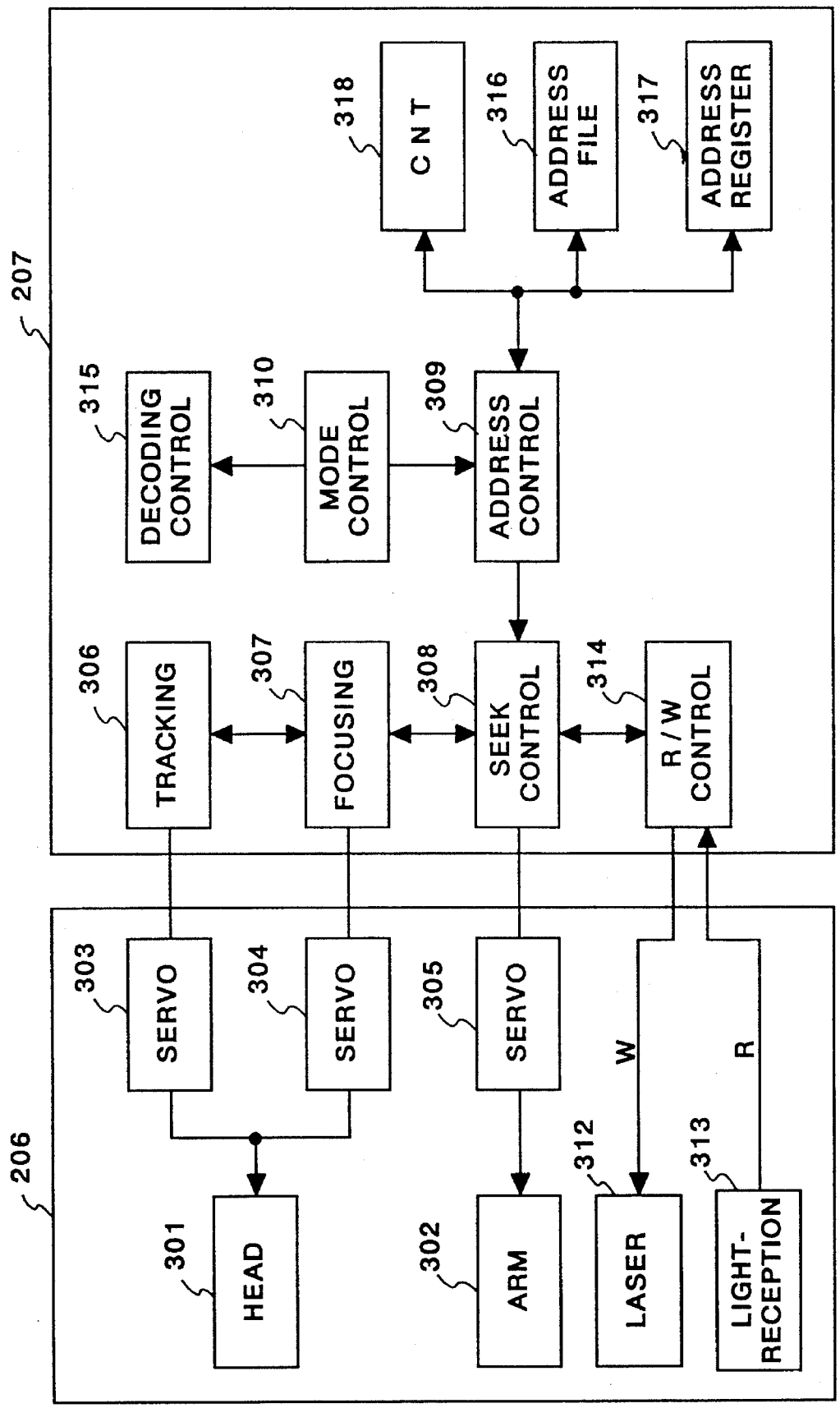
F I G. 8

| | |
|---|---|
| CNT = 0 | ADDRESS FILE LENGTH ( LNGTH ) |
| CNT = 1 | RECORDING ADDRESS OF 1st BASIC-FRAME DATA |
| CNT = 2 | RECORDING ADDRESS OF 2nd BASIC-FRAME DATA |
| CNT = 3 | RECORDING ADDRESS OF 3rd BASIC-FRAME DATA |

FIG. 12

IMAGES REPRODUCING METHOD CAPABLE OF SKIPPING REPRODUCTION OF COLLATERAL INFORMAITON DURING REPRODUCTION IN A SPECIAL MODE

BACKGROUND OF THE INVENTION

This invention relates to a method of reproducing recorded images and, more particularly, to a method of carrying out special reproduction, such as reverse reproduction, of image data.

First, a television signal will be described as an example of applying the reproducing method of the present invention. Much progress in the development of still-picture broadcasting utilizing high-definition television has been made in recent years. In such still-picture broadcasting, a high-definition signal possesses five times as much image information as in current NTSC broadcast television systems, and the screen is much wider. This is advantageous in that it is possible to enjoy realistic video having greater resolution.

Even though the images broadcast are still pictures, they contain a very large amount of information. Accordingly, in consideration of the limitations possessed by broadcast electric waves and the limit on channel capacity, still-picture broadcasting has been adapted in such a manner that a still picture can be transmitted even in a narrow transmission band (or at a low transmission rate) by compressing the information using compressive coding. More specifically, unlike moving pictures, the scenes in a still picture are stationary. In addition, since the time which a viewer has to see one scene ranges from several seconds to ten-odd seconds, it has been contemplated to transmit the image data at a bit rate of 2 Mbps.

FIGS. 1A and 1B illustrate the configuration of still-frame data when the data are transmitted. When the still-frame each data are transmitted, one frame of the transmitted data comprises frame-control data, image data, and sound or voice data, as illustrated in FIG. 1A. One item of frame-control data is annexed to one item of image data (sound data).

The frame-control data in FIG. 1A refer to data which describe the method of controlling the picture. Ordinarily, the frame-control data describe the method of controlling the frame when a changeover (switching) is made from one frame to the next. In still-picture broadcasting, frame control can include simple cut-switching control, wipe control, dissolve or scroll control, in which a gradual switching is made from one frame to the next, and partial rewrite control. The frame-control data include data indicating the type of frame control, data indicating the frame display mode, and address information indicative of a position at which rewriting is performed at the time of a partial rewrite. By using this frame-control data, the frame display method can be widely diversified to provide a more enjoyable picture.

In a case where frame control such as wipe, dissolve or scrolling is being carried out, the image data (FIG. 1A) to be transmitted will include all the image data of one frame. In order to simplify the description, the combination of frame-control data and image data, in which the image data include all the image data of one frame, shall be referred to as "basic-frame data" hereinafter.

The partial rewrite mode mentioned above is a mode of the following kind: In a transition from one frame to the next, there are cases where the image data of the next frame are obtained by rewriting only a portion of the image data of the frame transmitted previously. In such cases, all of the image data of the next frame are not transmitted; rather, the image data solely of the rewritten portion are transmitted to perform the rewriting of the frame. In this partial-rewrite mode, the image-data portion includes image data solely of the portion related to rewriting. For the sake of description, the combination of frame-control data, which are used in the partial rewrite, and the partial-frame data, which include the image to be altered, shall be referred to as "collateral information data" (see FIG. 1B), as opposed to the basic-frame data mentioned above.

On the other hand, large-capacity recording media such as optical disks and opto-magnetic disks have recently become generally available. One method of utilization contemplated is to receive a still-picture broadcast of the kind described above, record the received still picture on a recording medium of the above-mentioned kind, and reproduce or playback the still picture whenever necessary.

Accordingly, in a case where a series of transmitted images are recorded on a recording device of this type, the transmission data are recorded in the order in which they were received. In case of the frame control mentioned above, such as wipe control, dissolve control or scrolling control, and especially partial-rewrite control, the transmission sequence (or in other words, the recording sequence) is of very great importance. For example, in a case where a basic frame A and a basic frame B are dissolved, the basic-frame data of the basic frame A are transmitted first, and the basic-frame data for the basic frame B are transmitted next. The above-mentioned recording sequence is of upmost importance when the partial-rewrite mode is in effect. For example, as shown in FIG. 2, an initial scene X1 includes a circle, a triangle and a square. In the next scene X2, the square portion in the scene X1 is rewritten into the form of a rectangle. In the next scene Y, the entirety of the scene is changed over to a scene having one large circle. As illustrated in FIG. 3, the sequence of the transmission data for such frame control is as follows: First the data for scene X1 are transmitted, then the data for partially rewriting scene X1 to result in scene X2, and lastly the data for the scene Y. Since the data for rewriting is that involved in partial rewriting of the image of scene X1, the fact that these data follow the image data for the scene X1 is meaningful in the transmission sequence.

With regard to reproducing a recorded image using a playback device or the like, there are cases where a user may require a special reproduction technique, namely so-called reverse reproduction (i.e., playback in reverse order starting from the rear). If the recording device used in a reverse reproduction mode is an optical disk, a head is caused to seek in the reverse direction. If the recording device is a magnetic tape device, the direction of tape movement is reversed. In other words, in such a special reproduction mode, the sequence of frames to be read from the recording device differs from the sequence at the time of recording. Accordingly, in order to obtain a desired frame in the special reproduction mode, it is required that the address of the storage medium at which the frame is recorded be searched. However, a high-speed search of the recording medium addresses is difficult to realize owing to limitations imposed by the playback rate of the recording medium and by the amount of time required for decoding processing.

Furthermore, even if a high-speed search is possible, in actuality it is difficult in a reverse reproduction mode to reproduce compressively coded data in the reverse direction in the form of a time series, and to reproduce, in a direction entirely the reverse of that of ordinary reproduction, the operation performed at the time of frame changeover, described above. In particular, in the rewriting of a partial frame, the latter unfortunately is reproduced prior to the basic frame (the image composed of one frame), and therefore a normal frame cannot be reproduced.

This problem will be described in further detail with reference to FIGS. 4 and 5.

FIG. 4 shows an example in which an image has been recorded on an optical disk. It is assumed here that basic-frame data and partial-frame data for the 1st through 99th pictures have been recorded on a first track of the optical disk, and that basic-frame data and partial-frame data for 100th through 199th frames have been recorded on a second track of the optical disk. In case of reverse reproduction, a reading head performs a seeking operation from the second track to the first track, but the head reads the frame data in the forward direction on each track. Accordingly, if the playback device does not possess a buffer capacity for 100 scenes when the 100 pictures on the first track are reproduced in the reverse direction, the procedure that must be followed entails reading and reproducing the frame data of the 99th frame, waiting for the disk to make one revolution, and then reading and reproducing the frame of the 98th frame, and so on. Ultimately, the searching of the frame data requires considerable time. The most significant problem arises in a case where the frame data contain the aforementioned partial-frame data. If the first track in FIG. 4 is read in the reverse direction from the 99th frame, then, as shown in FIG. 5, the basic-frame data of the 99th picture is read first, then the partial-frame data for the 96th picture is read as the data of the 98th frame, next the partial-frame data for the 96th frame is read as the data of the 97th frame, and then the basic-frame data for the 96th frame is read as the data of the 96th frame. When it is attempted to reproduce the 98th and 97th frames, rewriting is carried out with regard to the 99th frame. Consequently, the rewritten frame is completely meaningless and presents an abnormal image.

This problem is not limited to a high-definition signal of the aforementioned kind but arises when other types of signals are reproduced as well, such as in the case of television conferences and the like.

SUMMARY OF THE INVENTION

Accordingly, an object of the present invention is to provide a method of carrying out excellent reproduction without reproducing abnormal frames, even when special reproduction is performed.

Another object of the present invention is to provide an image recording method and a recorded-image reproduction method capable of coping with high-speed special reproduction.

Still another object of the present invention is to provide a reproduction method which is capable of dealing with high-speed special reproduction, and which is capable of carrying out excellent special reproduction without reproducing abnormal frames.

In a preferred embodiment of the invention, special reproduction includes reverse reproduction or a high-speed search.

In a preferred embodiment of the invention, collateral information data is not reproduced as a collateral frame at the time of special reproduction.

In a preferred embodiment relating to the recording method of the present invention, recording addresses on a medium storing image data of a basic frame are produced as a file at the time the image is recorded.

Other objects and advantages besides those discussed above shall be apparent to those skilled in the art from the description of a preferred embodiment of the invention which follows. In the description, reference is made to accompanying drawings, which form a part thereof, and which illustrate an example of the invention. This example, however, is not exhaustive of the various embodiments of the invention, and therefore reference is made to the claims which follow the description for determining the scope of the invention.

BRIEF DESCRIPTION OF THE DRAWINGS

FIGS. 1A and 1B are diagrams for describing data formats in still-picture broadcasting to which a preferred embodiment of the invention and the prior art are applied;

FIG. 8 is a block diagram illustrating a controller in the recording/playback apparatus of the embodiment;

FIG. 12 is a diagram for describing the structure of an address file used in control according to the second embodiment.

DESCRIPTION OF THE PREFERRED EMBODIMENTS

Two embodiments (first and second embodiments) of the present invention will now be described with reference to the drawings.

Figure 6:
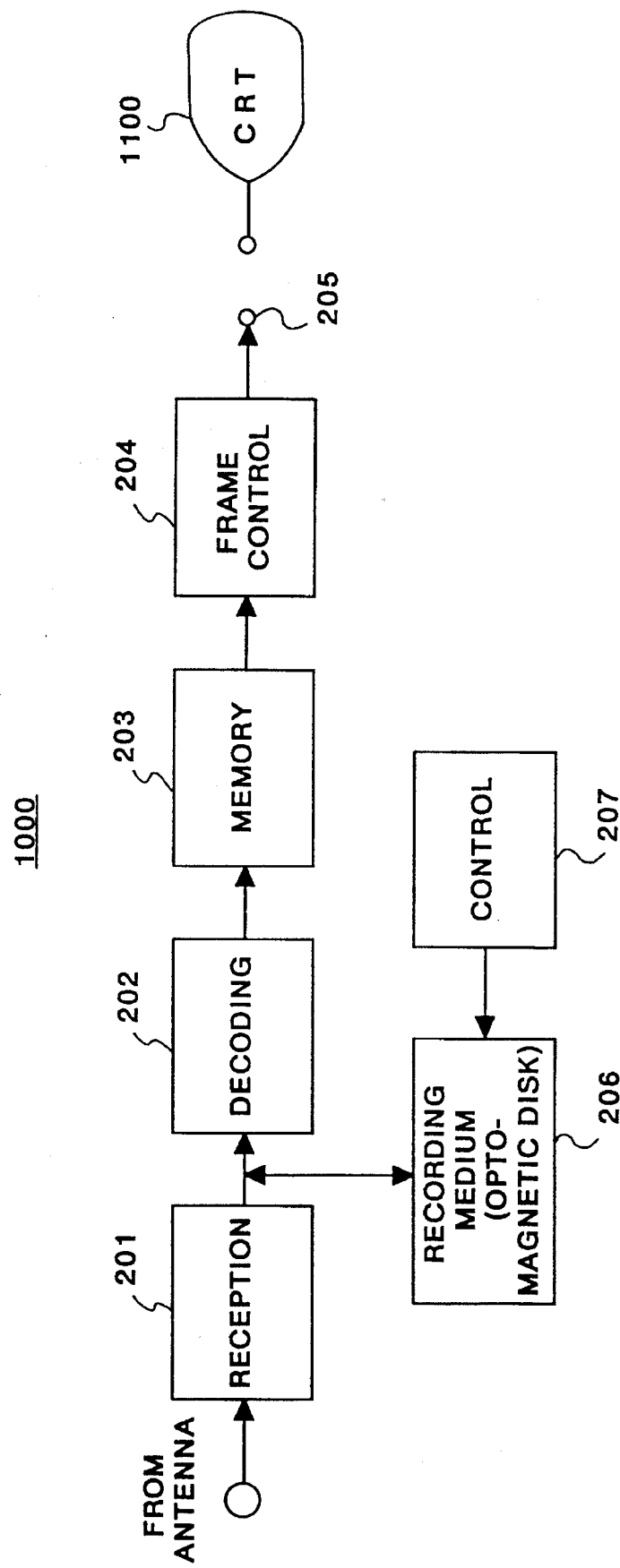
FIG. 6 is a block diagram illustrating a first preferred embodiment of a recording/playback apparatus.

In these two embodiments, the present invention is applied to an apparatus for receiving a broadcast still picture, recording the still picture and reproducing (playing back) the recorded image. The construction of the reproduction apparatus in both of these embodiments is substantially the same, and the functional blocks thereof are illustrated in FIG. 6.

In the two embodiments, the present invention is directed to special reproduction, in which special attention is paid to preventing the occurrence of abnormal frames at the time of reverse reproduction, and to high-speed reproduction.

Control in both embodiments is such that partial-frame data are discarded from the frame data read from the recording medium, and only basic-frame data in the read frame data are reproduced, thereby preventing the occurrence of abnormal frames and achieving high-speed reproduction. In frame control according to the first embodiment, all recorded frame information is read at the time of reverse reproduction or high-speed search. While the recorded frame information is being read, the partial-frame information, which causes the generation of abnormal frames at the time of reverse production or which is an encumbrance to a quicker high-speed search, is discarded, and frames are displayed based upon the basic-frame data alone. In frame control according to the second embodiment, on the other hand, a medium address at which basic-frame data are stored at the time of recording or prior to special reproduction is preserved beforehand. At the time of special reproduction or at the time of a high-speed search, only the basic-frame data are read from the medium in accordance with the address data, whereby the partial-frame data are discarded and frames are displayed based upon solely the basic-frame data. This difference in function between the two embodiments is the result mainly of a difference between the control procedures. These control procedures will be described later in accordance with the drawings.

CONSTRUCTION OF THE APPARATUS

The construction a playback apparatus 1000 according to the first and second embodiments will now be described with reference to FIG. 6.

The playback apparatus 1000 has two operating modes, namely a receiving mode for receiving a still-picture broadcast and outputting the broadcast to a display unit 1100 without change, and a recording/playback mode for reproducing a received signal after the signal is recorded on a recording medium. The recording/playback mode is of two types, namely a special reproduction mode and a forward-direction, ordinary-speed reproduction mode (hereinafter referred to as an "ordinary reproduction mode"). The special reproduction mode is of two types, namely a reverse reproduction mode and a high-speed search mode, as mentioned above.

The construction of the playback apparatus 1000 will be described first by discussing the signal flow in the operating mode for receiving a still-picture broadcast and outputting the broadcast to the display unit 1100 without change.

Figure 7:
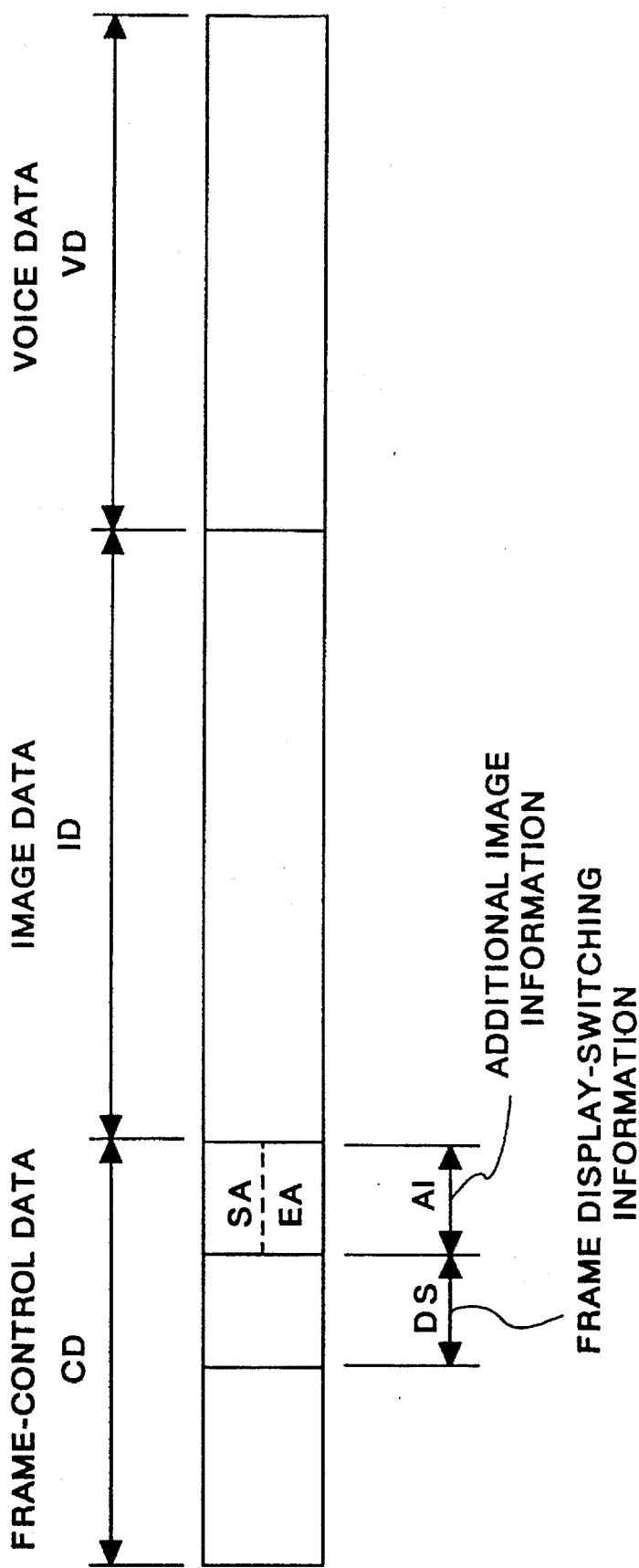
FIG. 7 is a diagram for describing the format of image data processed in the foregoing embodiment.

As shown in FIG. 6, a receiving circuit 201 receives broadcast radio waves which were compressed by means of an antenna (not shown). The radio waves form a still-picture information signal which is output to a decoding unit 202. As illustrated in FIG. 7, the compressed still-picture information signal referred to here is a signal in which image information for one frame is formed by frame-control data CD, which include frame-display switching information DS and additional image information AI, image data ID, and voice data VD. There are cases where the frame-control data CD and image data ID are referred to collectively as "basic-frame image data".

The decoding unit 202 decodes the compressed still-picture signal outputted by the receiving unit 201, thereby converting this signal into the original still-picture data and outputting the data to a frame memory 203. These image data decoded by the decoding unit 202 are stored in the frame memory 203 in frame units. In accordance with the frame-control data transmitted along with the image data, a frame control unit 204 reads out the image data stored in the memory 203 and delivers these data to the display unit 1100 via an output terminal 205.

Described next will be the flow of data in a case where a still-picture broadcast is received, temporarily recorded and subsequently reproduced. In this case, the compressed still-picture information signal outputted by the receiving unit 201 is recorded, in accordance with instructions from a controller 207, in an opto-magnetic disk device 206 serving as the recording medium. When the recorded image is reproduced, the recorded information in the opto-magnetic disk device 206 is read out in accordance with an instruction from the controller 207 and, if necessary, this information is processed. The recorded information is inputted to the decoding unit 2, after which the image information is delivered to the output terminal 205 through a procedure similar to that described above.

FIG. 8 illustrates the construction of the controller 207 and of the opto-magnetic disk device 206.

As is well known, the opto-magnetic disk device 206 comprises a head 301 having a laser element 312 and a light-receiving element 313, an arm 302 supporting the head 301, a servo-circuit 305 for controlling the positioning (seeking operation) of the arm 302, a servo-circuit 303 which acts as a tracking servo, and a servo-circuit 304 which acts as a focusing servo. These components are well known in the art and need not be described.

The controller 207 includes a tracking control circuit 306, a focusing control circuit 307, a seek control circuit 308, and a R/W control circuit 314 for controlling the reading/writing of data. The controller 307 further includes a mode control circuit 310 which determines whether ordinary reproduction or special reproduction is performed, an address-generation control circuit 309 which, in accordance with the determined mode, controls the generation of addresses at which data are written/read on the recording medium, and a decoding control circuit 315 which controls whether the data read by the light-receiving element 313 is sent to the decoding unit 202.

A record address in the optical disk apparatus is given to both the basic and partial frames. The controller 207 shown in FIG. 8 has an address file memory 316, which is used for control according to the second embodiment, for holding medium addresses at which basic-frame data are stored. An address register ADREG 317 stores a medium address at which image data about to be read by the controller 207 are recorded. Likewise, a counter CNT 318 is employed in the second embodiment and finds use in accessing the address file 316.

CONTROL PROCEDURE OF THE FIRST EMBODIMENT

The control procedure of the reverse-reproduction mode in the first embodiment will be described in accordance with FIGS. 9 and 10.

Figure 9:
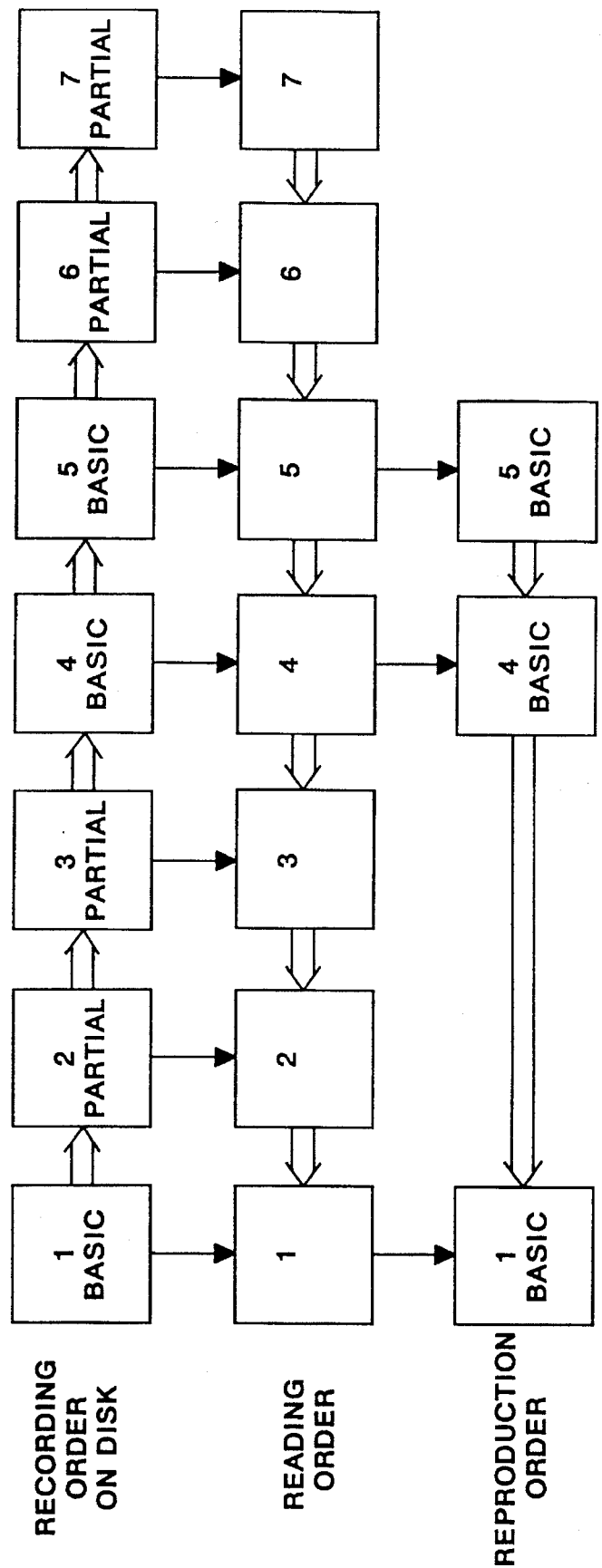
FIG. 9 is a diagram illustrating the flow of a control operation in the first embodiment.

FIG. 9 is the control procedure of the first embodiment and illustrates how a recorded image, having basic-frame data and partial-frame data, is read and reproduced at the time of reverse reproduction. In FIG. 9, data representing the first through the seventh frames are stored, in the order mentioned, on an opto-magnetic disk. The first, fourth and fifth frames are stored as basic-frame data, and the second, third, sixth and seventh frames are stored as partial-frame data. In accordance with the control of the first embodiment, the data are read from the disk in the following order: data of the seventh frame→data of the sixth frame→data of the fifth frame→data of the fourth frame→data of the third frame→ data of the second frame→data of the first frame.

Figure 2:
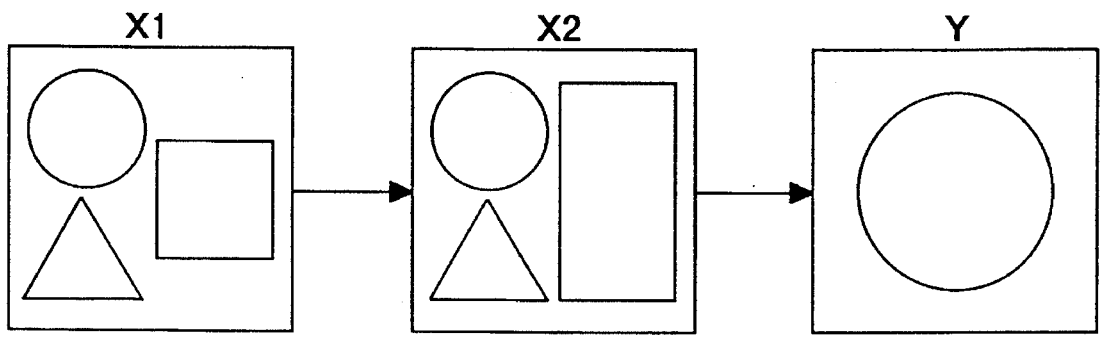
FIGS. 2, 3, 4 and 5 are diagrams for describing the reason why problems arise in the prior art.
Figure 3:
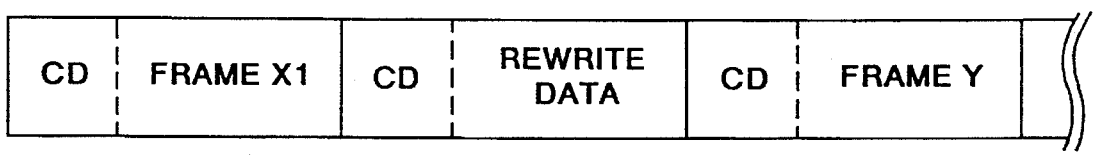
Figure 4:
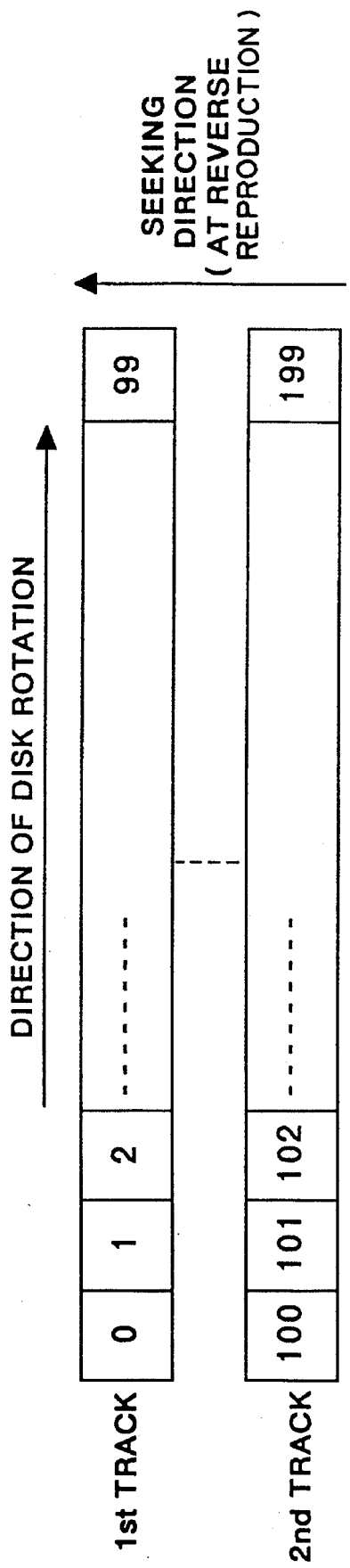
Figure 5:
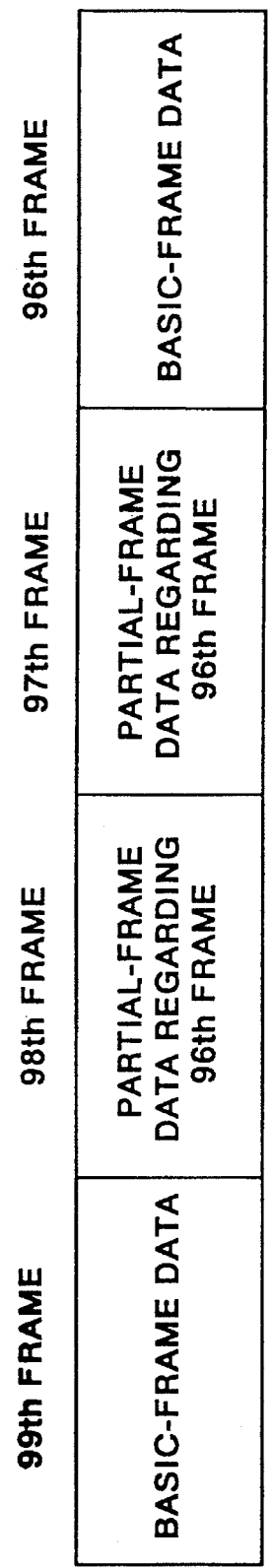

Whenever each item of frame data is read out, it is determined based upon the frame-control data whether the read item of frame data is basic-frame data or partial-frame data. In case of partial-frame data, the data are not decoded/reproduced. Decoding/reproduction is carried out only in case of basic-frame data. Thus, in the example of FIG. 9, the basic-frame data are reproduced and displayed in the following order: basic-frame data of the fifth frame→ basic-frame data of the fourth frame→basic-frame data of the first frame. That is, the partial-frame data are discarded and only the basic-frame data are reproduced. Therefore, reproducing of a partial frame regarding an erroneous frame, described earlier in connection with FIG. 5, does not take place. As a result, an abnormal display is not produced.

Figure 10:
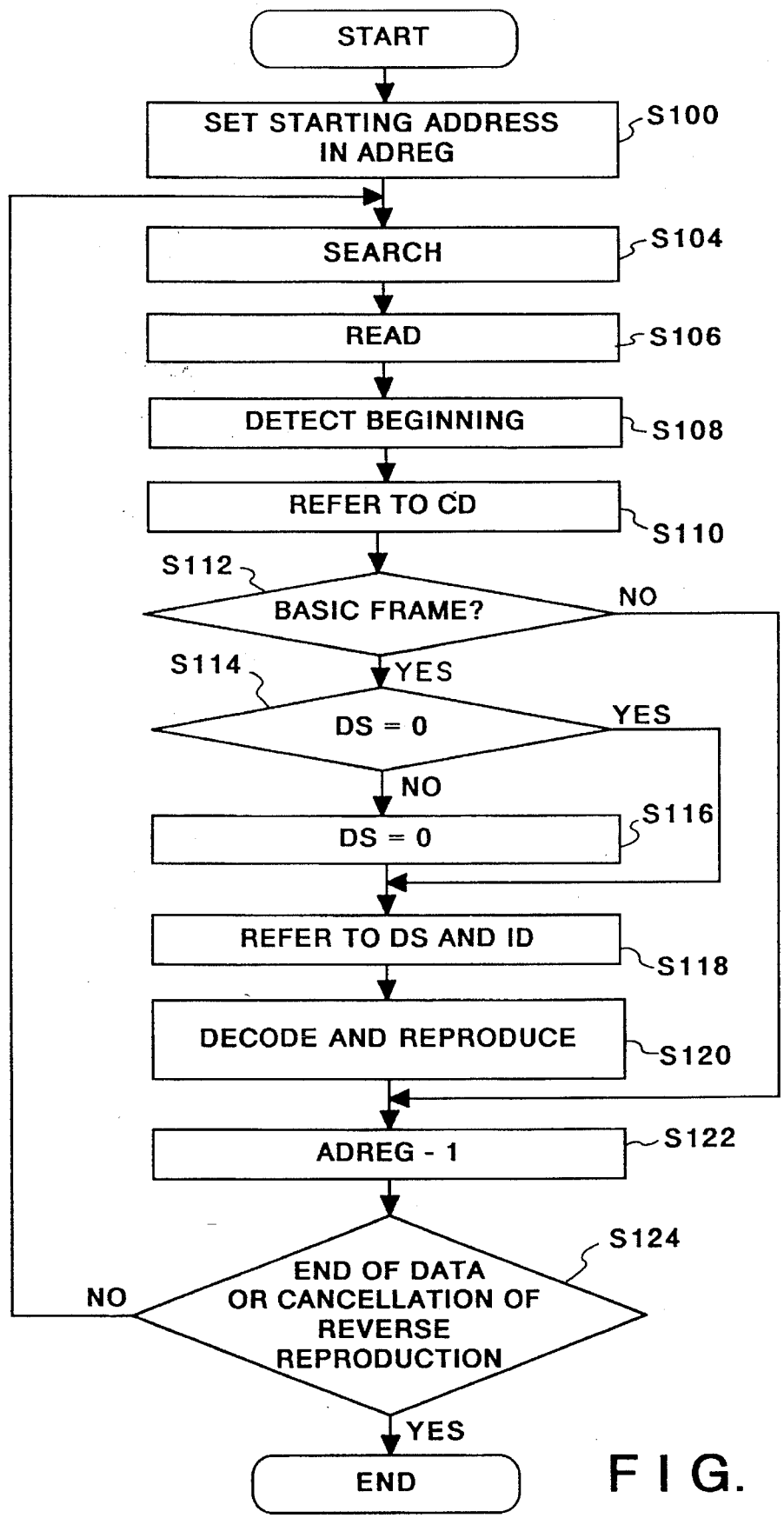
FIG. 10 is a flowchart illustrating the control procedure of the first embodiment.

FIG. 10 is a flowchart showing the control procedure when the reverse-production mode of the first embodiment is in effect. This control procedure is initiated when the mode control unit senses that the operator has selected reverse production.

First, at step S100 in FIG. 10, the starting address of reverse reproduction is set in the register ADREG. Next, at step S104, the head 301 is made to seek the starting address in order to search for the recording portion which corresponds to the value of the register ADREG. This is followed by step S106, at which the data of a frame information block recorded at the relevant address are read. The frame information block referred to here indicates a block comprising by the image data, sound data and frame-control data illustrated in FIG. 7. The beginning of the read frame information block is detected at step S108. With regard to detection of the "beginning" of the block, there are cases where one item of frame data extends over several tracks. In such case, the beginning (i.e., the frame-control data) of the frame information block is on the single outermost track, and therefore it is necessary to detect the beginning in order to read this frame-control data. Accordingly, if one item of frame data does not extend over several tracks, the beginning of the data of one frame read at step S106 is simply the beginning of the block, but if the one item of frame data does extend over several tracks, it is necessary to seek the aforementioned track on the outermost side. Such detection of the beginning of the information block can be carried out by detecting an identifier, which signifies the frame-control data, in the data shown in FIG. 7, or simply by detecting a break in the data constituting one frame.

When the beginning is detected, the program proceeds to step S110. Here the frame-control data CD contained in the pertinent block is read out and it is determined, based on the additional image information AI (see FIG. 7) of the image contained in the frame-control data CD, whether the image data contained in the frame information block is a basic frame or a partial frame.

As shown in FIG. 7, a display starting address SA and end address EA on the frame of the image data have been written in the additional image information AI. Whether the image information is basic-frame data or partial-frame data can be determined depending upon these values. More specifically, in a case where one frame is constituted by n×m pixels, the starting address SA of the basic frame will be (0,0), and the end address EA will be (n−1,m−1). Accordingly, in a case where the following hold:

SA=(0,0)

EA=(n−1,m−1)

this frame signifies basic-frame data. Frame data having additional information AI which does not satisfy either of the aforementioned relations is indicative of partial-frame data.

Another method of making this determination is to insert a flag, for example a flag bit, which is indicative of basic-frame data or partial-frame data, in the additional information AI at the time of transmission, and determine based upon this flag bit whether the data are basic-frame data or partial-frame data.

If, based upon the foregoing determination, it is determined that the image information is not basic-frame data, i.e., if it is determined that the image information is partial-frame data, control skips S114 through S120 and proceeds to step S122. Thus, the partial-frame data are skipped, as described earlier in connection with FIG. 9.

In a case where the frame data read out at step S106 are determined to be basic-frame data at step S112, reference is made at step S114 to the display switching information DS (see FIG. 7), which is contained in the frame-control data CD, and the value of DS is compared with "0". If the switching information DS does not designate an ordinary cut switching (DS≠0), namely in a case where wipe, dissolve or scrolling is indicated, the program proceeds to step S116, at which step the value of the display switching information DS is rewritten into a value which indicates ordinary cut-switching. More specifically, the operation DS=0 is performed. On the other hand, if the switching information DS represents ordinary cut switching (DS=0), then the program proceeds to step S118. The reason for making the value of the switching information DS "0" at all times with regard to the basic frame information is as follows: In the present embodiment, the arrangement is such that the partial-frame data are skipped. Consequently, there are instances where the relationship between video images from one basic frame to the next is lost. In such cases, preserving the original value of the frame-control data (DS≠0) for wipe, dissolve or scrolling and then performing frame control would result instead in a displayed frame which is not attractive. Furthermore, since ordinary 'cut-changeover' (cut-switching) is the fastest method to changeover a frame screen, it provides a faster reproduction during the special reproduction. This is why the value of the switching information DS is made "0" at all times.

Thus, at step S118, the frame-control data CD and image data ID are read in a form where DS is made "0" in the frame-control data. Next, at step S120, decoding of the image data ID is performed by the decoding unit 202, and image reproduction is carried out in accordance with the display switching information (DS=0), which is indicative of the cut-switching mode.

In order to read out the immediately preceding block of image data, the value in address register ADREG is decremented by one at step S122.

The operations of steps S104 through 122 set forth above are repeated until it is detected, at step S124, whether the reverse-reproduction mode has been cancelled or the data are at an end.

The foregoing has been described for a case where reverse reproduction is carried out. However, in the case of a forward search, namely forward high-speed reproduction, it will suffice to alter the operations at step S100, S122 and S124, for example, ADREG−1 at step S122 to ADREG+1. If this approach is adopted, display solely of basic frames in which partial-frame data are ignored is reproduced in the forward direction at high speed. In addition, in case of ordinary forward reproduction, it will suffice to change step S122 to ADREG+1 and to delete the control operations of steps S112 through S116.

EFFECTS OF THE FIRST EMBODIMENT

In the special reproduction method of the first embodiment as described above, the frame-control data CD is detected in the recorded information constituted by the frame-control data CD, image data ID and voice data VD. If the additional information AI of the image contained in the image-control data CD is indicative of basic-frame data constituted by image data which include all of the image information equivalent to one frame, only then will an image be reproduced upon decoding the image data ID, recorded along with the frame-control data CD, and changing the information DS, which is used in frame-display switching and contained in the frame-control data CD, to the ordinary cut-switching mode (DS=0). Thus, at the time of reverse reproduction, partial-frame data, which is constituted by image data ID containing image information of only a portion of one frame, are not reproduced. Only basic-frame data, which are constituted by image data ID containing all of the information of one frame, are successively reproduced by the ordinary cut-switching mode (DS=0), and abnormal images are not reproduced during reverse reproduction.

Furthermore, at the time of a high-speed search, only the basic-frame data are decoded and reproduced, and the searching speed is raised only for portions where the partial-frame data are not displayed.

SECOND EMBODIMENT

During special reproduction in the first embodiment, as described above, the determination as to whether the read frame data are basic-frame data is made, in real-time, based upon the value of the additional information AI in the frame data. Accordingly, in the first embodiment, whether the frame data are partial-frame data cannot be determined unless the frame data are read. This means that the frame data are always read even if they are partial-frame data. The second embodiment described below is adapted to achieve higher speed by arranging it so that the partial-frame data are not read.

Figure 11:
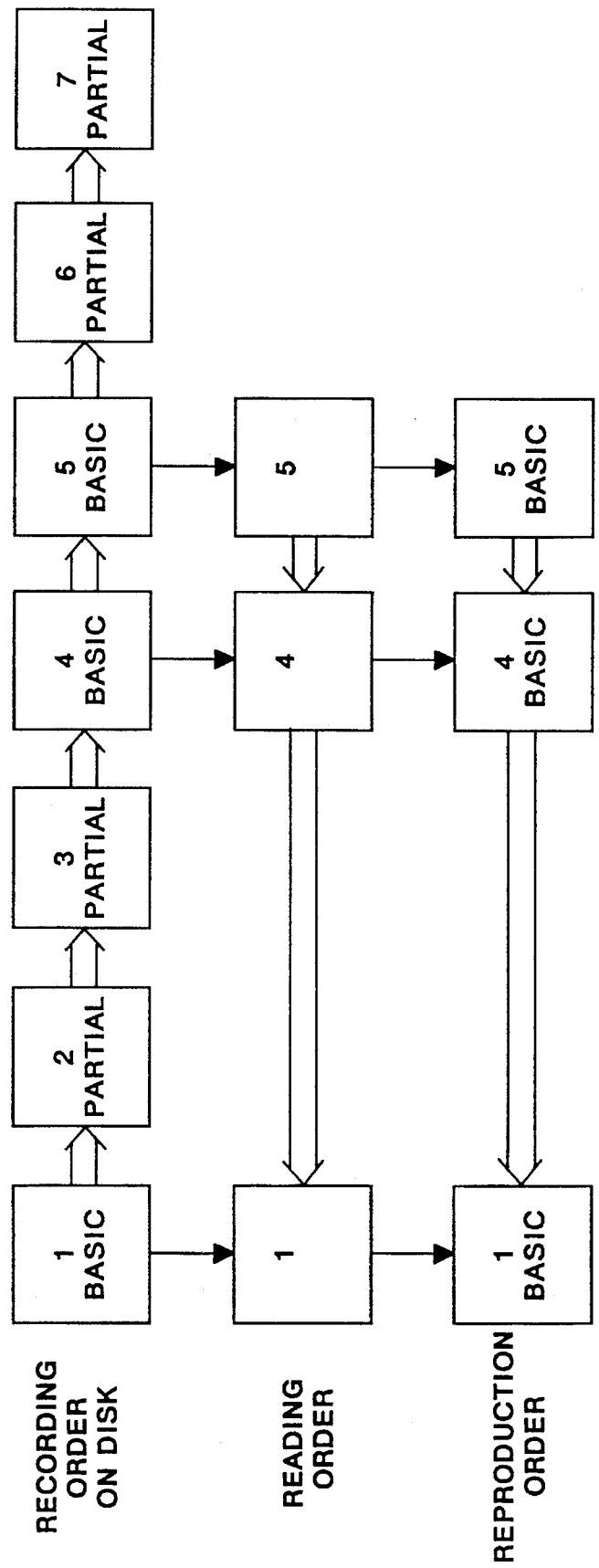
FIG. 11 is a diagram illustrating the flow of the control operation in a second embodiment.

In the second embodiment, as shown in FIG. 11, data indicative of addresses at which the basic-frame data are recorded are created as an address file prior to special reproduction. Then, when special reproduction is carried out, only the portions of the medium on which the basic-frame data are stored are read selectively in accordance with this file, thereby skipping the partial-frame data. In the example of FIG. 11, the items of second, third, sixth and seventh partial-frame data are not read.

The address file is created in the address file memory 316 of FIG. 8 in the form shown in FIG. 12. Accessing of the address file is carried out via the counter CNT 318. The address file is created and registered for every group of images recorded. At the 0 address (CNT=0) of each file, the number of records (LNGTH) of the file is stored, and the opto-magnetic disk address at which the first item of basic-frame data of this recorded image has been recorded, is stored at the 1 address (CNT=1). The opto-magnetic disk address at which the second item of basic-frame data of this recorded image has been recorded, is stored at the 2 address (CNT=2), and the opto-magnetic disk address at which the third item of basic-frame data of this recorded image has been recorded, is stored at the 3 address (CNT=3).

It is desired that the address file be created at least prior to special reproduction, e.g., at the time of recording or immediately before the special reproduction thereof. The reason for this is as follows: If the address file is created at the time of recording or immediately before the special reproduction of the recording, it will be possible to examine, in the forward direction, the frame data to be recorded or the frame data already recorded, in order to determine whether the data are basic-frame data or not. As a result, file creation can be performed at high speed.

Figure 13:
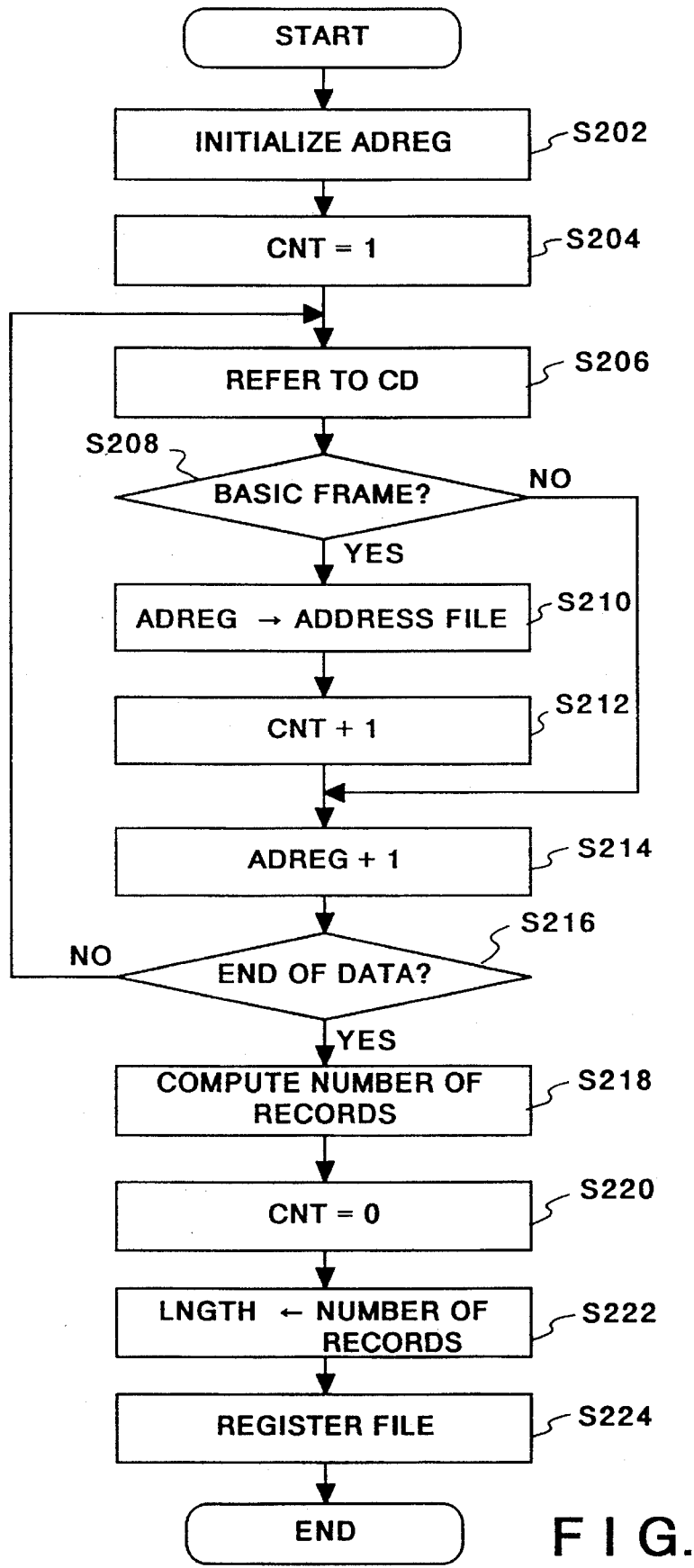
FIGS. 13 and 14 are flowcharts showing a control procedure according to the second embodiment.

FIG. 13 is a flowchart illustrating the control procedure for creating such an address file at the time an image file is recorded. The control procedure of FIG. 13 commences when it is detected that the receiving unit 201 has started recording a still-picture broadcast, and the procedure is executed in parallel with this recording of the still picture.

First, at step S202 of the flowchart, the value of the physical address of the medium at which the first received frame information block is to be recorded is set in the register ADREG, thereby initializing the register. The counter CNT is set to "1" at step S204. Steps S206 through S214 are applied to all frame information blocks that are to be recorded. That is, at step S206, reference is made to the frame-control data CD of the block to be recorded, and these frame-control data CD are used at step S208 to determine whether the image data ID contained in the frame information block are basic-frame data. This determination is the same as the technique of step S112 in the first embodiment.

If the frame data to be recorded are not basic-frame data, then steps S210, S212 are skipped and the program proceeds to step S214, at which the register ADREG is incremented by one. On the other hand, if is is determined at step S208 that the frame data to be recorded are basic-frame data, then, at step S210, the contents of the register ADREG are written at the address of the address file 316 designated by the counter CNT, and the register ADREG is incremented by one at step S212.

The operations of steps S206 through S214 are repeated at step S216 until it is determined that the recording of the data has ended.

When the end of the data to be recorded is sensed at step S216, the number of records that have been written in the address file are counted at step S218, and the value of the count is written in the 0 address (LNGTH) of the record file (steps S220, S222). Then, at step S224, this file is registered as the address file.

An address information file of these basic-frame data is thus created.

In a case where the creation of the address information file is performed after recording an image file but before special reproduction e.g., it will suffice to alter the operation of steps S206 and S208 to an operation in which frame data are read from the opto-magnetic disk in accordance with the value set in the register ADREG, reference is made to the frame-control data CD of the read frame data, and it is determined at step S208 whether a frame is a basic frame. The creation of the address information file may be performed immediately after recording the image file or during vacant hours after the recording.

Figure 14:
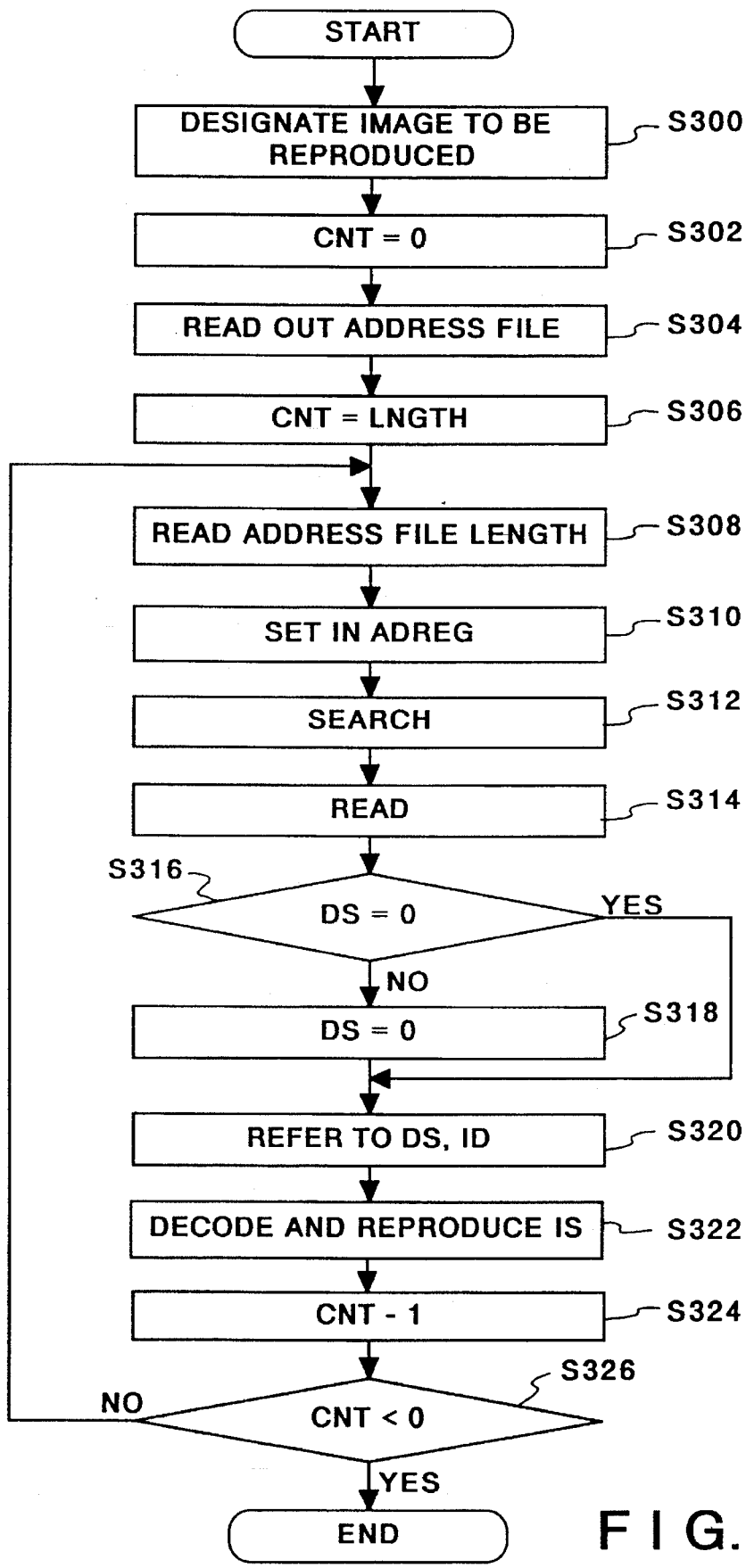

Next, operation at the time of reverse reproduction in the second embodiment will be described in accordance with the flowchart of FIG. 14. This control procedure is initiated when the mode control unit 310 senses that the operator has selected reverse production.

First, at step S300, the recorded image to undergo special reproduction is designated, and the address file corresponding to this recorded image is designated. Next, in order to determine the number of records in this address file, CNT is set to "0" at step S302 and the 0 address, namely LNGTH, is read at step S304. LNGTH is set in the counter CNT at step S306. As a result, the address of the address file that includes the address information at which the final basic-frame data of this recorded image has been stored is set in the counter CNT.

The address file is read in accordance with the value in counter CNT at step S308, and the data read at step S308 are set in the register ADREG at step S310. If the read data value is n, then this is the address at which n-th item of basic-frame data has been stored on the opto-magnetic disk. Accordingly, this address is searched and the item of basic-frame data at this address is read out at steps S312 and S314.

The operations at steps S316 through S322 are the same as those of steps S114 through S120 of the first embodiment. That is, after the frame control mode is changed to ordinary cut switching (DS=0), the decoding unit 202 for decoding the basic-frame data is made to perform decoding/reproduction. The value in counter CNT is decremented by one (CNT=CNT–1) at step S334. The program then returns to step S308 via step S326, and the operations of steps S308 through S324 are repeated.

A reverse search for basic frames is carried out by decrementing the value of CNT one count at a time at step S324.

The foregoing description relates to reproduction in the reverse direction. In case of a search in the forward direction, it will suffice to alter the operation of step S302 to CNT=1 and alter the operation of step S324 to CNT=CNT+1.

EFFECTS OF THE SECOND EMBODIMENT

In accordance with the second embodiment described above, the addresses at which the basic-frame data have been recorded in advance are filed before special reproduction. As a result, the processing of the special reproduction operation is simplified and can be raised in speed.

MODIFICATIONS

The present invention can be modified in various ways without departing from the scope of the claims.

By way of example, in the two embodiments described above, an opto-magnetic disk is used as the recording medium 206. However, it is permissible to use other means, such as a WOM (write-once memory) optical disk or memory such as a dip-switch-type memory or semiconductor memory. In addition, though the reproduction method can be altered in various ways depending upon the type of recording medium, all such alterations are covered by the present invention.

Further, in the two embodiments described above, only the basic-frame data are reproduced at the time of special reproduction. However, the present invention is not limited to such an arrangement. If all of the aforementioned collateral information is not to be reproduced, a modification in which part of the collateral information is reproduced is covered by the present invention in addition to reproduction of the basic-frame data.

The structure of the frame data block is not limited to that shown in FIG. 7.

In accordance with the embodiments of the present invention, as will readily be appreciated from the foregoing description, partial-frame data alone, which represent an incomplete frame, are not reproduced, and a disturbed frame such as one that presents an abnormal frame is not reproduced at the time of a display changeover.

Further, in a case where a forward search is performed, only basic-frame data, which occupy the principal portion of recorded image information, are decoded. As a result, searching can be raised in speed to an extent corresponding to the time required for reading, decoding and displaying the partial-frame data.

In the control procedures of the two foregoing embodiments, control is performed in such a manner that the data contained in a frame block are read out for every single frame block on a block-by-block basis. However, this can be modified in the following manner: The controller 207 can be provided with a buffer having a capacity for one track of an opto-magnetic disk or optical disk, and it can be so arranged that when the frame data are read, one track of the frame data are first read to the buffer and then the individual items of frame data are fetched from the buffer. Adopting such an arrangement makes it possible to eliminate an inefficient operation in which the reading of one block always requires one revolution at the time of reverse reproduction.

Further, in the two embodiments described above, a record address is given to the basic and partial frames, where the lengths of the frames are fixed and the same. Since the present invention is not limited to such embodiments a further modification can be proposed, wherein every track of an optical disk has a header field which includes the numbers of the basic and partial frames recorded in the track, and the sequence number of the top frame of the track. According to such a modification, a further advantage that the volume of recording area of the disk apparatus can be minimized is obtained.

The present invention is not limited to the above embodiments and various changes and modifications can be made within the spirit and scope of the present invention. Therefore, to appraise the public of the scope of the present invention, the following claims are made.

What is claimed is:

1. A reproducing method for reproducing images by reading an image signal recorded on a recording medium, the image signal including (i) a plurality of basic blocks each including basic image data capable of independently representing an image and (ii) a plurality of collateral blocks each including collateral image data capable of representing the image when supplemented with basic image data, each of the basic blocks and collateral blocks including additional data capable of identifying a block as a basic block or as a collateral block, said reproducing method comprising the steps of:

reading the image signal from the recording medium in a reverse sequence which is reverse from a recording sequence;

discriminating whether a block included in the reverse read image signal is a basic block or a collateral block in accordance with the additional data included in the block; and reproducing, in accordance with the results of said discriminating step, only the basic image data from the reverse-read image signal.

2. A reproducing method according to claim 1, wherein the recording medium comprises a disc recording medium.

3. A reproducing method according to claim 1, wherein said reproducing method includes a normal reproduction mode and a reverse reproduction mode, and wherein said reading step comprises the step of selecting one of the normal reproduction mode, in which the basic blocks and the collateral blocks are read in a sequence corresponding to a recording sequence of the image signal, and the reverse reproduction mode, in which the basic blocks and the collateral blocks are read in a reverse sequence which is reverse from a recording sequence of the image signal.

4. A reproducing method according to claim 3, wherein, when the reverse reproduction mode is selected, the basic image data is reproduced and at least a portion of the collateral image data is not reproduced, and wherein, when the normal reproduction mode is selected, the basic image data is reproduced and the collateral image data is reproduced.

5. A reproducing method according to claim 1, wherein the basic image data and the collateral image data have been compressed by encoding, and wherein said reproducing step comprises a step of decoding the encoded image data.

6. A reproducing method according to claim 1, wherein the collateral image data represents a partial image to be superimposed on an image represented by the basic image data.

7. A reproducing apparatus for reproducing images by reading an image signal recorded on a recording medium, the image signal including (i) a plurality of basic blocks each including basic image data capable of independently representing an image and (ii) a plurality of collateral blocks each including collateral image data capable of representing the image when supplemented with basic image data, each of the basic blocks and collateral blocks including additional data capable of identifying a block as a basic block or a collateral block, said reproducing apparatus comprising:

reading means for reading the image signal from the recording medium;

setting means for setting a mode of the reproducing apparatus from among a plurality of modes including a normal reproduction mode, in which basic blocks and collateral blocks are read by said reading means in a sequence corresponding to a recording sequence of the image signal, and a reverse reproduction mode, in which the basic blocks and collateral blocks are read by said reading means in a sequence reverse to a recording sequence of the image signal;

discriminating means for discriminating whether a block in the image signal read by said reading means is a basic block or a collateral block by using the additional data included in the block, and for producing a discrimination output; and reproducing means for reproducing, in accordance with the discrimination output of said discriminating means, only basic image data in the reverse reproduction mode and for reproducing data from both the basic blocks and collateral blocks in the normal reproduction mode.

8. A reproducing apparatus according to claim 7, wherein the basic image data and the collateral image data have been compressed by encoding, and wherein said reproducing means comprises a decoding circuit for decoding the encoded image data.

* * * * *

UNITED STATES PATENT AND TRADEMARK OFFICE
CERTIFICATE OF CORRECTION

PATENT NO. : 5,502,570                        Page 1 of 2
DATED      : March 26, 1996
INVENTOR(S): AKIHIRO SHIKAKURA, ET AL.

It is certified that error appears in the above-indentified patent and that said Letters Patent is hereby corrected as shown below:

On the title page:

Item [54], and column 1, in the Title:

"IMAGES" should read --IMAGE-- and "INFORMAITON" should read --INFORMATION--.

At [56] References Cited

Insert --5,012,352  4/1991  Yoshimura et al.--

At [56] Other Publications

"Netwerks," should read --Networks--.

Column 1

Line 1, "IMAGES" should read --IMAGE--.
Line 3, "INFORMAITION" should read --INFORMATION--.
Line 37, "each" should be deleted and "frame" should read --frame each--.

Column 5

Line 18, "a" should read --of a--.

UNITED STATES PATENT AND TRADEMARK OFFICE
CERTIFICATE OF CORRECTION

PATENT NO. : 5,502,570

DATED : March 26, 1996

INVENTOR(S) : AKIHIRO SHIKAKURA, ET AL.

It is certified that error appears in the above-indentified patent and that said Letters Patent is hereby corrected as shown below:

Column 7

Line 19, "by" should be deleted.
Line 65, "and" should read --and to--.

Column 10

Line 21, "is is" should read --it is--.

Column 11

Line 12, "step S334." should read --step S324.--.

Signed and Sealed this

Thirteenth Day of August, 1996

BRUCE LEHMAN

Attest:

Attesting Officer

Commissioner of Patents and Trademarks